Dec. 30, 1941.   P. J. BROWNSCOMBE   2,267,811
PHOTOGRAPHIC CAMERA
Filed April 19, 1940    2 Sheets-Sheet 1
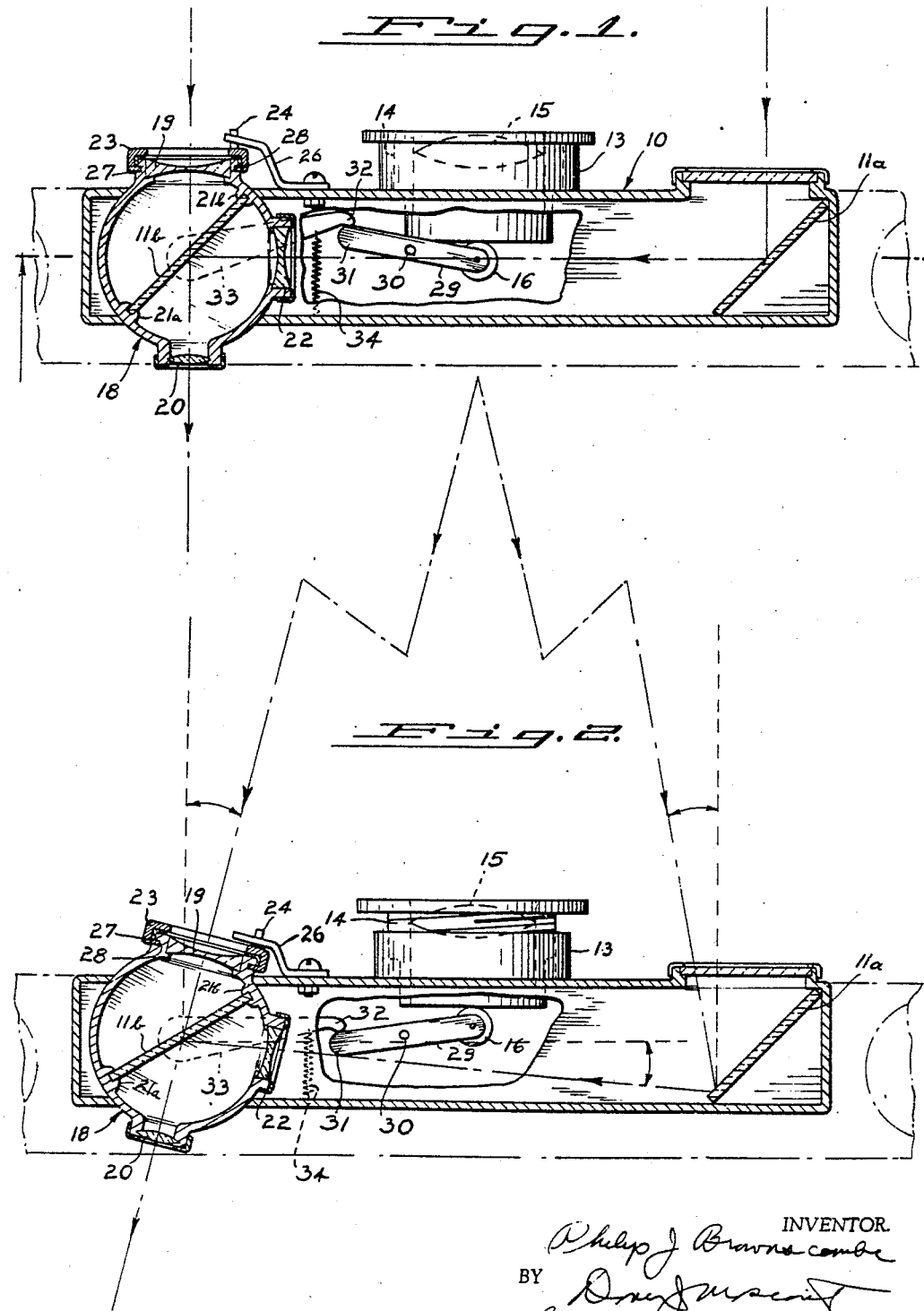

Dec. 30, 1941.　　　P. J. BROWNSCOMBE　　　2,267,811
PHOTOGRAPHIC CAMERA
Filed April 19, 1940　　　2 Sheets-Sheet 2

INVENTOR.
Philip J. Brownscombe
BY
ATTORNEY.

Patented Dec. 30, 1941

2,267,811

UNITED STATES PATENT OFFICE 2,267,811

PHOTOGRAPHIC CAMERA

Philip J. Brownscombe, East Orange, N. J., assignor to Universal Camera Corporation, New York, N. Y., a corporation of New York Application April 19, 1940, Serial No. 330,437

14 Claims. (Cl. 95—44)

This invention relates to improvements in cameras, incorporating range and view finders, being particularly directed to a combination range and view finder operative to provide automatic correction for parallax with respect to the objective of the camera in both the vertical and horizontal planes.

The combined range and view finder is of the coincidence type wherein the optical axis of the view finder coincides with the direct observation axis of the range finder and may be coupled to the objective of the camera for actuation by the objective focusing mechanism or may be applied independently of such mechanism in conjunction with a focal scale of the character presently used on accessory range finders.

By virtue of the structural formation of cameras incorporating or having associated therewith view finders, or combined range and view finders which are not in the same horizontal and vertical plane as that of the objective lens, considerable difficulty has been encountered in providing correction or compensation for parallax between the optical axes of the view finder and the objective lens, as the range of an object is being measured.

Broadly, it is an object of this invention to provide a combined range and view finder for use in association with the objective lens of a camera wherein the view finder and the movable basis of the range finder, be it a mirror or prism and mirror basis range finder, are incorporated in a single unit angularly displaceable with respect to the axis of the objective and the fixed basis of the range finder, thereby to automatically correct for horizontal parallax between the camera objective and the view finder as the range is being measured.

It is a further object of this invention to provide for a combined range and view finder for use in conjunction with the objective lens of a camera, wherein the view finder, the movable basis of the range finder and a displaceable mask are incorporated in an angularly displaceable turret, which functions by displacement, as the range is being measured to automatically correct for horizontal and vertical parallax between the camera objective and the view finder.

Specifically, it is an object of this invention to provide for operation by the focusing mechanism of the objective lens of a camera, a combined range and view finder assembly wherein the elements of the view finder, the movable basis of the range finder and the mask for the view finder objective lens are assembled in a turret mounted for angular displacement about a vertical axis, the mask being in addition vertically slidable with respect to the turret, whereby as the objective lens is being focused, the view finder and movable basis of the range finder are angularly displaced by the focusing mechanism in addition to secondary vertical displacement of the mask, thereby to provide automatic correction for parallax in all planes.

These and other advantages, capabilities and features of the invention will appear from the subjoined detailed description of one specific embodiment thereof illustrated in the accompanying drawings, in which Figure 1 is a plan view partially in section showing the combined range and view finder set at infinity.

Figure 2 is a plan view partially in section showing the range and view finder set for distances less than infinity.

Figure 3:
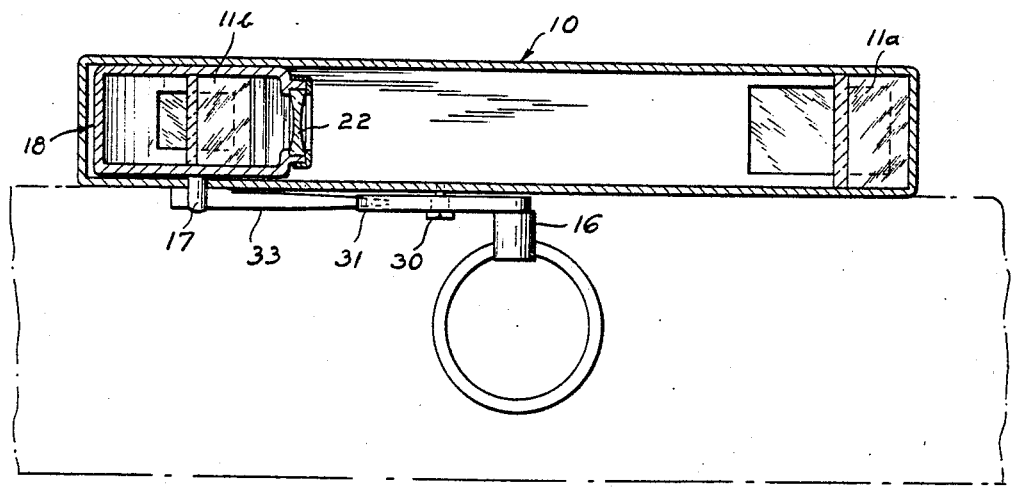
Figure 3 is a front elevation taken in section along lines 3—3 of Figure 1.

The drawings have been directed to only those features of a camera construction incorporating the combined range and view finder forming the subject matter of this invention, as are associated with the same in their operation.

Referring to the reference characters in the drawings, there is mounted at the upper section of the camera casing shown in broken outline, a range finder tube or barrel 10 having openings or windows at opposite ends thereof and mounting behind one of the windows and at an angle thereto a fixed mirror 11a and behind the other of the windows a semi-transparent mirror 11b, movable relative to the fixed mirror, the mounting and function of which movable mirror will be later described.

Below the range finder tube 10 and midway with respect to the windows of the same there is positioned in the front wall of the camera casing an interiorly threaded ring 13 with which there cooperates exteriorly threaded lens focusing barrel 14 mounting at its outer end the objective lens 15 and providing at its inner end a continuous contacting surface for coaction with the roller 16 of the distance measuring mechanism operable as the lens is focused.

Within the range finder tube 10 and at the end opposite to that carrying the fixed mirror 11a there is fixedly mounted as by keying upon upstanding stub shaft 17 a turret 18 of substantially cylindrical conformation; such turret as shown in Figures 1 and 2 being mounted for angular displacement about a vertically extending axis in a plane normal to the optical axis of the objective lens 15. The turret 18 has mounted at diametrically opposite portions thereof field objective lens 19 and view finder eye piece lens 20 directly in line, the respective lens as mounted in the turret serving as a direct view view finder.

Between the field objective lens 19 and the eye piece lens 20 of the view finder there is interposed by fixed mounting in guides 21a and 21b and in diagonal relationship with respect to the aforesaid lens of the view finder, the semi-transparent mirror 11b, the same being normally in parallelism with the fixed mirror 11a at the opposite end of the range finder tube 10 and serving to reflect into the eye piece lens 20 light previously reflected by the fixed mirror 11a, while at the same time permitting by virtue of its semi-transparency, for direct view of the object from the eye piece lens 20 through the field objective lens 19.

A second field objective lens 22 which is similar in properties to that of the field objective lens 19 of the view finder is mounted on the periphery of the turret substantially midway between the field objective and eye piece lens of the view finder so as to be interposed in the light path between mirrors 11a and 11b of the range finder, in order that the images as viewed through the light path respectively of the view finder and the mirrors of the range finder may be of like size.

On the turret 18 and in front of the mounting for the field objective lens 19 there is provided an assembly mounting for vertical reciprocation of a mask or framing member 23. A pin 24 projects forwardly of the framing member at one of its corners and such pin rides in inclined slot 25 of bracket 26 which is fixedly mounted at the front of the range finder tube 10 adjacent the path of the turret. The mask or framing member 23 is provided with opposing channel formations along the sides thereof defined by in-bent wings 27, the wings being slidable within grooves 28 on opposing sides of the mounting on the turret 18 of the field objective lens 19, thereby to provide for a straight-line movement of the mask or framing member as the turret carrying the view finder elements and movable mirror basis of the range finder is angularly displaced by the mechanism now to be described.

Referring to Figures 1 to 3, roller 16 is carried on the coupling lever 29 which is mounted for angular displacement about pivot 30, the free end 31 of coupling lever 29 being on constant contact with the cam end 32 of lever 33 which is keyed to shaft 17 mounting the turret 18, the turret lever being maintained in constant contact with the coupling lever 27 by spring 34, one end of which is fastened to the rear wall of the camera and the other end of which is fastened to the turret lever 31 intermediate its ends.

Figure 4:
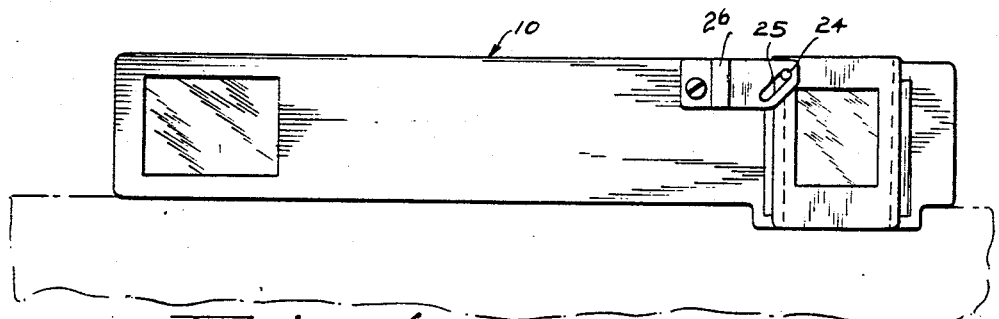
Figure 4 is a front elevation showing the position of the framing mask in the combined range and view finder when the range finder is set at infinity.
Figure 5:
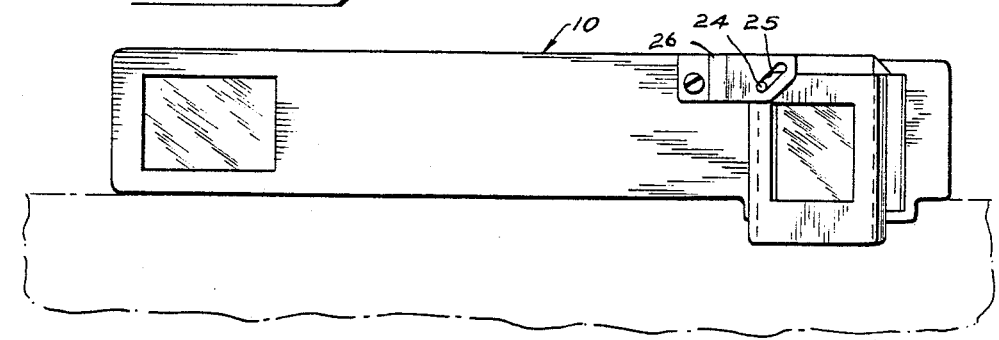
Figure 5 is a front elevation showing the position of the framing mask in the combined range and view finder when the range is set at distances less than infinity.

The operation of the range finder and view finder assembly to measure the distance as the objective lens is focused is clearly illustrated in Figures 1 and 2, which respectively show the position of the objective lens, the turret carrying the view finder and the movable mirror basis of the range finder and the mechanism interlinking the same as the objective lens is focused; in Figure 1 the range finder is set at infinity whereas in Figure 2 the range finder is set for distances less than infinity and as the objective lens is focused upon an object nearer than infinity by displacement away from the front face of the camera, the turret is displaced angularly in the amount required until substantially the direct line of sight through the view finder lens of the turret crosses the optical axis of the objective at the object. As the turret is rotated to the right the mask or framing member 23 mounted forwardly of the field objective lens is vertically displaced from the position shown in Figure 3 to that shown in Figure 4, as the pins 24 ride in angular grooves 25 and wings 27 are guided in vertical grooves 28 on the turret.

By virtue of the angular movement of the turret carrying the view finder as the objective lens is focused on the object horizontal parallax is compensated; by virtue of the vertical reciprocation of the mask carried in advance of the field objective lens of the view finder as the turret carrying the latter is angularly displaced vertical parallax normally caused by the relative difference in position of the view finder with respect to the objective is corrected.

Since the turret carries all of the elements of the view finder including the mask and the movable basis mirror of the range finder, all of which are actuated simultaneously by the mechanism interlinking the turret to the objective lens, automatic correction is provided for both horizontal and vertical parallax between the view finder and the objective lens as the object distance is measured through focusing of the objective lens.

It is obvious that various changes and modifications may be made to the details of construction without departing from the general spirit of the invention as set forth in the appended claims.

I claim:

1. In a camera, an objective lens, a range and view finder assembly combined in a unit, openings at opposite ends of the unit, fixed and movable elements mounted adjacent the respective range finder openings to define a basis range finder, a movable turret carrying the semi-transparent element of the range finder, diametrically opposing lens mounted in the turret to form a direct vision view finder, the said semi-transparent element being diagonally interposed therebetween, said turret being mounted for angular displacement with respect to the opening of the unit and about a vertical axis.

2. In a camera, an objective lens, a range and view finder assembly combined in a unit, openings at opposite ends of the unit, fixed and movable mirrors mounted adjacent the respective range finder openings to define a mirror basis range finder, a movable turret carrying the semi-transparent mirror of the range finder, diametrically opposing lenses mounted in the turret to form a direct vision view finder, the said semi-transparent mirror being diagonally interposed therebetween, said turret being mounted for angular displacement with respect to the opening of the unit and about a vertical axis.

3. In a camera, an objective axially displaceable for focusing, a combined range finder and view finder, the viewing and measuring elements of which are normally disposed horizontally and vertically of the objective lens, a turret mounted in the range finder tube for angular displacement about a vertical axis with respect thereto, a pair of windows in the range finder equidistant from the objective, a fixed element of the range finder behind one of the windows, the turret being disposed behind the other of the windows, diametrically opposing lens on the turret defining a view finder, a diagonally disposed semi-transparent range finder element interposed in the turret between the lens of the view finder, a linkage connecting the objective and the turret, whereby as the objective is axially displaced for focusing, the turret and the elements thereof are angularly displaced about the turret mounting axis, thereby to measure the distance and simultaneously correct for parallax of the view finder with respect to the objective lens.

4. In a camera, an objective axially displaceable for focusing, a combined range finder and view finder, the viewing and measuring elements of which are normally disposed horizontally and vertically of the objective lens, a turret mounted in the range finder tube for angular displacement about a vertical axis with respect thereto, a pair of windows in the range finder equidistant from the objective, a fixed element of the range finder behind one of the windows, the turret being disposed behind the other of the windows, diametrically opposing lenses on the turret defining a view finder, a diagonally disposed semi-transparent range finder element in the turret interposed between the lens of the view finder, a linkage connecting the objective and the turret, a framing element vertically reciprocable with respect to the turret, means for actuating said framing element as the turret is radially displaced, whereby as the objective is axially displaced for focusing the turret and the elements thereof are angularly displaced about the turret mounting axis, and as the turret is displaced the framing element is vertically displaced with respect to the turret, thereby to simultaneously correct the view finder for parallax in all planes with respect to the objective lens as the distance of the object is measured.

5. In a camera construction, an objective, a casing carrying a combined range and view finder assembly, openings at opposite ends of said casing, angular and parallelly mounted mirrors disposed opposite the respective openings of the barrel, one mirror being fixed and the other being semi-transparent and movable, thereby to form a mirror basis range finder and a turret mounted for angular displacement with respect to one of the windows of the casing and about a vertical axis, diametrically opposing lenses mounted at the turret to form thereby a direct vision view finder the movable mirror of the range finder being interposed between the view finder lens of the turret, and mechanism interlinking the objective and the turret, whereby as the same is axially displaced for focusing, the turret is angularly displaced about its axis, thereby to correct for parallax of the view finder in the turret with respect to the objective as the distance of the object is measured.

6. In a camera construction, an objective, a casing carrying a combined range and view finder assembly, openings at opposite ends of said casing, angular and parallelly mounted mirrors disposed opposite the respective openings of the barrel, one mirror being fixed and the other being semi-transparent and movable, thereby to form a mirror basis range finder, and a turret mounted for angular displacement with respect to one of the windows of the casing and about a vertical axis, diametrically opposing lenses mounted at the turret to form thereby a direct vision view finder, the movable mirror of the range finder being interposed between the view finder lens of the turret, a framing element guided for vertical reciprocation along the turret adjacent one of the lenses of the view finder therein, means actuating said framing element as the turret is angularly displaced, a mechanism interlinking the objective and the turret, whereby as the objective is axially displaced for focusing the turret and the elements thereof are angularly displaced about the turret mounting axis, and as the turret is displaced the framing element is vertically displaced with respect to the turret, thereby to simultaneously correct the view finder for parallax in all planes with respect to the objective lens as the distance of the object is measured.

7. In a photographic camera having an objective axially movable for focusing a mirror basis distance meter and a radially displaceable view finder of the direct view type, the range finder and view finder being combined in a single assembly wherein at one end of the range finder tube there is mounted the fixed mirror and at the other end of the range finder tube there is disposed a turret mounted for angular movement about a vertically extending axis, said turret having mounted at diametrically opposing peripheral portions thereof field objective and eye piece lens in direct line defining the view finder and fixedly mounted and interposed therebetween in angular relation with respect thereto, a semi-transparent mirror forming the movable mirror of the range finder, and a linkage mechanism connecting the objective and the turret, operable as the objective lens is axially displaced in focusing upon an object, for angularly displacing the turret and the view finder and range finder elements carried therein, thereby compensating for horizontal parallax between the camera objective and the view finder as the distance is being measured.

8. In a photographic camera having an objective axially movable for focusing a mirror basis distance meter and an angularly displaceable view finder of the direct view type, the range finder and view finder being combined in a single assembly wherein at one end of the range finder tube there is mounted the fixed mirror and at the other end of the range finder tube there is disposed a turret mounted for angular movement about a vertically extending axis, said turret having mounted at diametrically opposing peripheral portions thereof field objective and eye piece lens in direct line defining the view finder and fixedly mounted and interposed therebetween in angular relation with respect thereto, a semi-transparent mirror forming the movable mirror of the range finder, and a linkage mechanism connecting the objective and the turret, operable as the objective lens is axially displaced in focusing upon an object, for angularly displacing the turret and the view finder and range finder elements carried therein, thereby compensating for horizontal parallax between the camera objective and the view finder as the distance is being measured, and a framing member mounted on the turret adjacent the field objective lens of the view finder and means for vertically displacing the framing member as the turret is angularly displaced, thereby to correct for vertical parallax between the view finder lens and the objective, the correction for horizontal and vertical parallax being automatically and simultaneously effectuated as the objective is axially displaced for focusing.

9. In a photographic camera in combination with an objective movable axially for focusing a range and view finder assembly wherein the windows of the range finder are at opposite sides of and equi-distant from the objective lens, a fixed mirror angularly mounted at the rear of one of the range finder windows, and a turret comprising the view finder mounted for angular displacement about a vertical axis at the other window of the range finder, said turret having diametrically opposing lens defining respectively a field objective lens and a view finder eye piece lens, and a semi-transparent mirror extending diagonally across the turret between the field objective lens and the eye piece lens, a second field objective lens of same optical properties as that of the first field objective lens interposed between the fixed and movable mirrors, and means actuable by the camera objective lens as it is focused, for angularly displacing the turret, whereby the optical axis of the view finder carried in the turret crosses the axis of the objective lens at the object, thereby to compensate for horizontal parallax between the view finder and the objective lens as the object distance is measured.

10. In a photographic camera in combination with an objective movable axially for focusing, a range and view finder assembly wherein the windows of the range finder are at opposite sides of and equi-distant from the objective lens, a fixed mirror angularly mounted at the rear of one of the range finder windows, and a turret comprising the view finder mounted for angular displacement about a vertical axis at the other window of the range finder, said turret having diametrically opposing lens defining respectively a field objective lens and a view finder eye piece lens, and a semi-transparent mirror extending diagonally across the turret between the field objective lens and the eye piece lens, a second field objective lens of same optical properties as that of the first field objective lens interposed between the fixed and movable mirrors, and a framing mask mounted on the turret for sliding movement, and means for guiding the framing mask for vertical sliding movement as the turret is angularly displaced, and means actuable by the camera objective lens as it is focused for angularly displacing the turret, whereby the optical axis of the view finder carried in the turret crosses the axis of the objective lens at the object to compensate for horizontal parallax, and for vertically displacing the framing mask with respect to the turret as the latter is angularly displaced, whereby the field of view of the objective lens and the view finder coincide at the object, thereby to compensate for vertical parallax between the view finder and objective lens.

11. In a camera, an objective axially displaceable for focusing, and a view finder mounted for radial displacement about an axis in a plane normal to the axis of the objective, a framing member mounted for reciprocation with respect to said view finder, means operably linking the objective with the view finder and the framing member, whereby as the objective is focused upon an object closer to the camera than infinity, the view finder is angularly displaced about its axis to cause the optical axis thereof to cross the axis of the objective at the object and the framing element is displaced with respect to the view finder, thereby to simultaneously correct for parallax between the view finder and the objective.

12. In a camera, an objective axially displaceable for focusing, and a view finder mounted for radial displacement about an axis in a plane normal to the axis of the objective, a framing member mounted for reciprocation with respect to said view finder, means operatively linking the objective and view finder, and means operatively linking said view finder and framing element, whereby as the objective is being focused upon an object, the view finder is angularly displaced about its axis and the framing element is vertically displaced with respect to the view finder, thereby to simultaneously correct for parallax between the view finder and the objective as the optical axes of the view finder and the objective cross at the object.

13. In a camera, an objective axially displaceable for focusing, and a view finder disposed horizontally and vertically of said objective, and mounted for radial displacement about a vertical axis in a plane normal to the axis of the objective, a framing member mounted for reciprocation with respect to said view finder, means operatively linking the objective and view finder, and means operatively linking said view finder and framing element, whereby as the objective is being focused upon an object the view finder is angularly displaced about its axis and the framing element is reciprocated with respect to the view finder, thereby to simultaneously correct for parallax between the view finder and the object as the optical axes of the view finder and the objective cross at the object.

14. In a camera, an objective axially displaceable for focusing, and a view finder disposed horizontally and vertically of said objective, and mounted for radial displacement about a vertical axis in a plane normal to the axis of the objective, a framing member slidably mounted on said view finder for vertical reciprocation, means operatively linking the objective and view finder, and means operatively linking said view finder and framing element, whereby as the objective is being focused upon an object the view finder is angularly displaced about its axis and the framing element is vertically displaced with respect to the view finder, thereby to simultaneously correct for parallax between the view finder and the object as the optical axes of the view finder and the objective cross at the object.

PHILIP J. BROWNSCOMBE.